US008619252B2

(12) United States Patent
Nakasho

(10) Patent No.: US 8,619,252 B2
(45) Date of Patent: Dec. 31, 2013

(54) MICROSCOPE INCLUDING A LIGHT INTENSITY MEASURING UNIT FOR MEASURING AN INTENSITY OF LIGHT EMITTED FROM THE MICROSCOPE

(75) Inventor: Eiji Nakasho, Kyoto (JP)

(73) Assignee: Olympus Corporation, Tokyo (JP)

( * ) Notice: Subject to any disclaimer, the term of this patent is extended or adjusted under 35 U.S.C. 154(b) by 116 days.

(21) Appl. No.: 13/298,521

(22) Filed: Nov. 17, 2011

(65) Prior Publication Data

US 2012/0133925 A1    May 31, 2012

(30) Foreign Application Priority Data

Nov. 26, 2010   (JP) ................................. 2010-263184

(51) Int. Cl.
*G01J 1/42* (2006.01)
(52) U.S. Cl.
CPC .......................................... *G01J 1/42* (2013.01)
USPC .......................................................... 356/218
(58) Field of Classification Search
CPC .............................................................. G01J 1/42
USPC .................................................. 356/218–222
See application file for complete search history.

(56) References Cited

U.S. PATENT DOCUMENTS

| 3,851,949 | A | 12/1974 | Kraft et al. | |
| 4,302,087 | A | 11/1981 | Reinheimer et al. | |
| 4,639,139 | A * | 1/1987 | Wyant et al. | 356/497 |
| 5,480,804 | A * | 1/1996 | Niwa et al. | 435/286.1 |
| 5,713,364 | A * | 2/1998 | DeBaryshe et al. | 600/476 |
| 5,835,228 | A * | 11/1998 | Okazaki et al. | 356/432 |
| 7,289,265 | B2 | 10/2007 | Koyama | |
| 7,436,590 | B2 | 10/2008 | Hattori | |
| 8,149,423 | B2 * | 4/2012 | Sakamoto | 356/620 |
| 2004/0227944 | A1 * | 11/2004 | Fukui et al. | 356/401 |
| 2005/0275938 | A1 * | 12/2005 | Koyama | 359/385 |
| 2007/0081233 | A1 | 4/2007 | Hattori | |
| 2012/0075456 | A1 * | 3/2012 | Seitz | 348/79 |

FOREIGN PATENT DOCUMENTS

| JP | 2005-091701 A | 4/2005 |
| JP | 2005-352146 A | 12/2005 |
| JP | 2007-93988 A | 4/2007 |
| JP | 2007-183111 A | 7/2007 |
| JP | 2009-271046 A | 11/2009 |

OTHER PUBLICATIONS

Extended European Search Report (EESR) dated Feb. 29, 2012 (in English) in counterpart European Application No. 11009203.8.

* cited by examiner

*Primary Examiner* — Michael P Stafira
(74) *Attorney, Agent, or Firm* — Holtz, Holtz, Goodman & Chick, PC

(57) ABSTRACT

A light intensity measuring unit for measuring an intensity of light emitted from a microscope includes an aperture stop, a field stop, at least one measurement lens arranged between the aperture stop and the field stop, and an interface for attachment to a microscope. The aperture stop is positioned on or close to a back focal plane of the at least one measurement lens. The field stop is positioned on or close to a front focal plane of the at least one measurement lens.

16 Claims, 8 Drawing Sheets

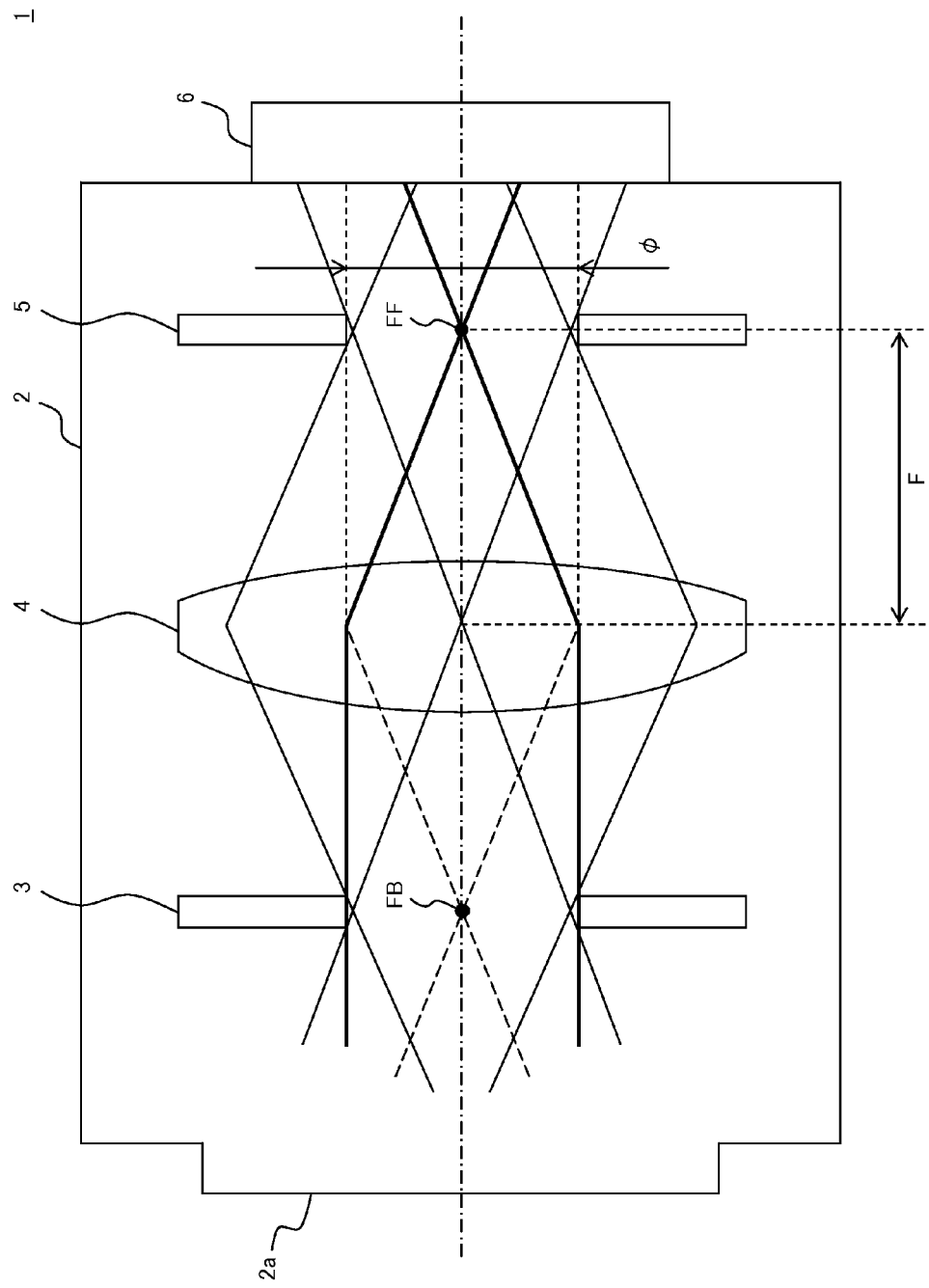
F I G. 1

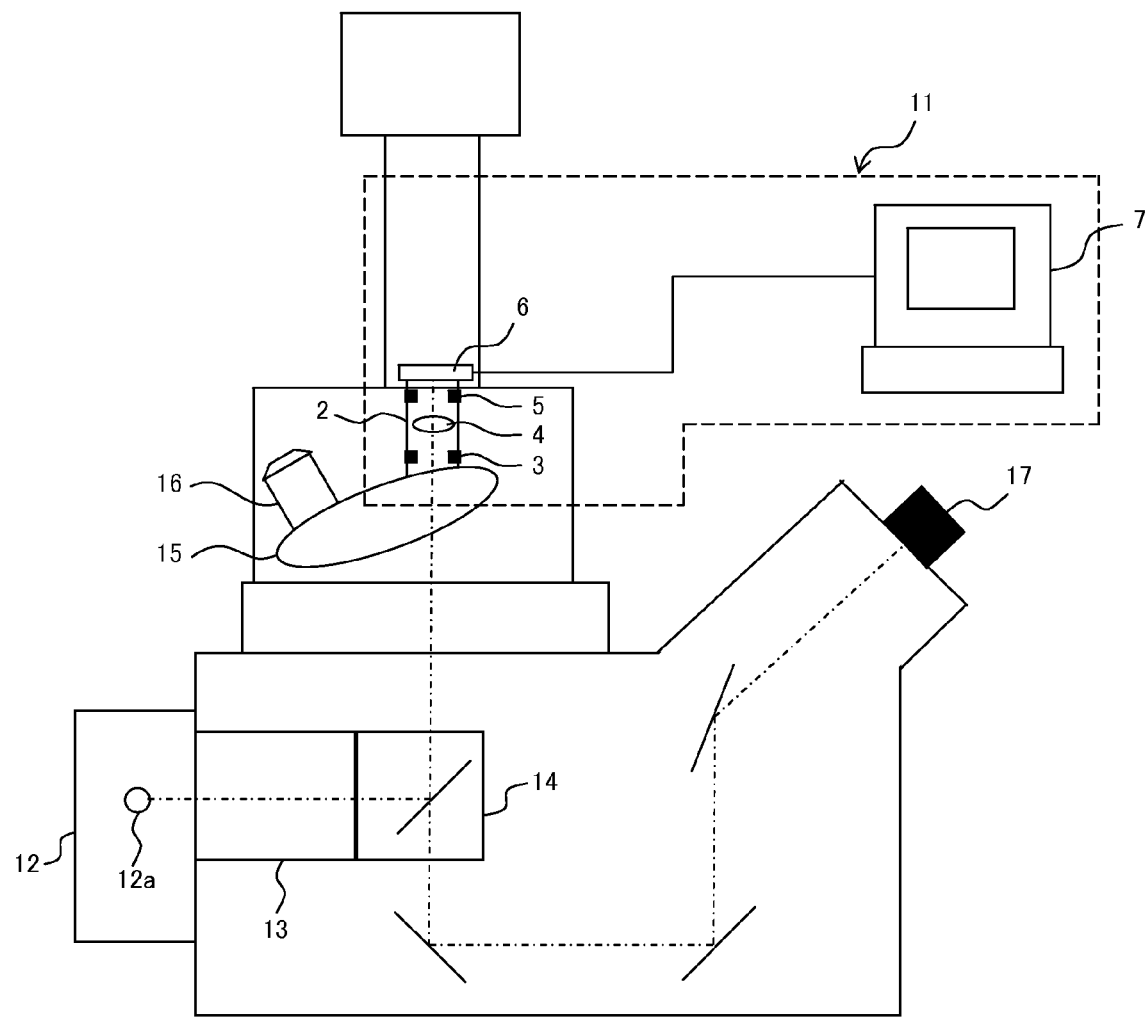
F I G. 2

MICROSCOPE INCLUDING A LIGHT INTENSITY MEASURING UNIT FOR MEASURING AN INTENSITY OF LIGHT EMITTED FROM THE MICROSCOPE

CROSS REFERENCE TO RELATED APPLICATIONS

This application is based upon and claims the benefit of priority from the prior Japanese Patent Applications No. 2010-263184, filed Nov. 26, 2010, the entire contents of which are incorporated herein by this reference.

BACKGROUND OF THE INVENTION

1. Field of the Invention

The present invention relates to a light intensity measuring unit and a microscope including the light intensity measuring unit.

2. Description of the Related Art

In recent years, in the field of vital observation, fluorescent observation has been more and more important owing in part to diversified objects to be observed since practical application of fluorescent proteins such as GFP (Green Fluorescent Protein) and YFP (Yellow Fluorescent Protein).

In the fluorescent observation of a biological specimen, minimizing damage to the biological specimen is important. Irradiating the biological specimen with excitation light with an excessive intensity is undesirable. Furthermore, the light intensity per unit area of the excitation light impinging on the specimen needs to be determined to ensure the reproducibility and reliability of the observation.

In order to meet such a demand, various techniques to measure the intensity of excitation light or stimulation light (light quantity) impinging on a specimen have been proposed in the field of the microscopy.

Japanese Patent Laid-Open Publication No. 2007-93988 and Japanese Patent Laid-Open Publication No. 2007-183111 disclose a technique in which a branching optical element such as a beam splitter or a half mirror is arranged in an optical path for laser light so that part of laser light incident on the branching optical element can be guided to a photodetector, thus allowing the quantity of laser light impinging on a specimen to be determined based on the quantity of laser light detected by the photodetector.

Japanese Patent Laid-Open Publication No. 2005-352146 and Japanese Patent Laid-Open Publication No. 2005-91701 disclose a technique to measure the intensity of excitation light emitted from an objective, using a photodetector placed on a stage.

SUMMARY OF THE INVENTION

An aspect of the present invention is a light intensity measuring unit for measuring an intensity of light emitted from a microscope, the light intensity measuring unit including an aperture stop, a field stop, at least one measurement lens arranged between the aperture stop and the field stop, and an interface for attachment to a microscope, wherein the aperture stop is positioned on or close to a back focal plane of the at least one measurement lens, and the field stop is positioned on or close to a front focal plane of the at least one measurement lens.

Another aspect of the present invention is a microscope including an objective and a light intensity measuring unit including an aperture stop arranged on or close to a plane conjugate to a back focal plane of the objective, a field stop arranged on or close to a plane conjugate to a front focal plane of the objective, and at least one measurement lens arranged between the aperture stop and the field stop, wherein the aperture stop is positioned on or close to a back focal plane of the at least one measurement lens, and the field stop is positioned on or close to a front focal plane of the at least one measurement lens.

BRIEF DESCRIPTION OF THE DRAWINGS

The present invention will be more apparent from the following detailed description when the accompanying drawings are referenced.

FIG. 1 is a diagram illustrating a basic configuration of a light intensity measuring unit according to embodiments.

FIG. 2 is a diagram illustrating a configuration of a microscope including a light intensity measuring unit according to Embodiment 1.

DESCRIPTION OF THE PREFERRED EMBODIMENTS

Figure 3:
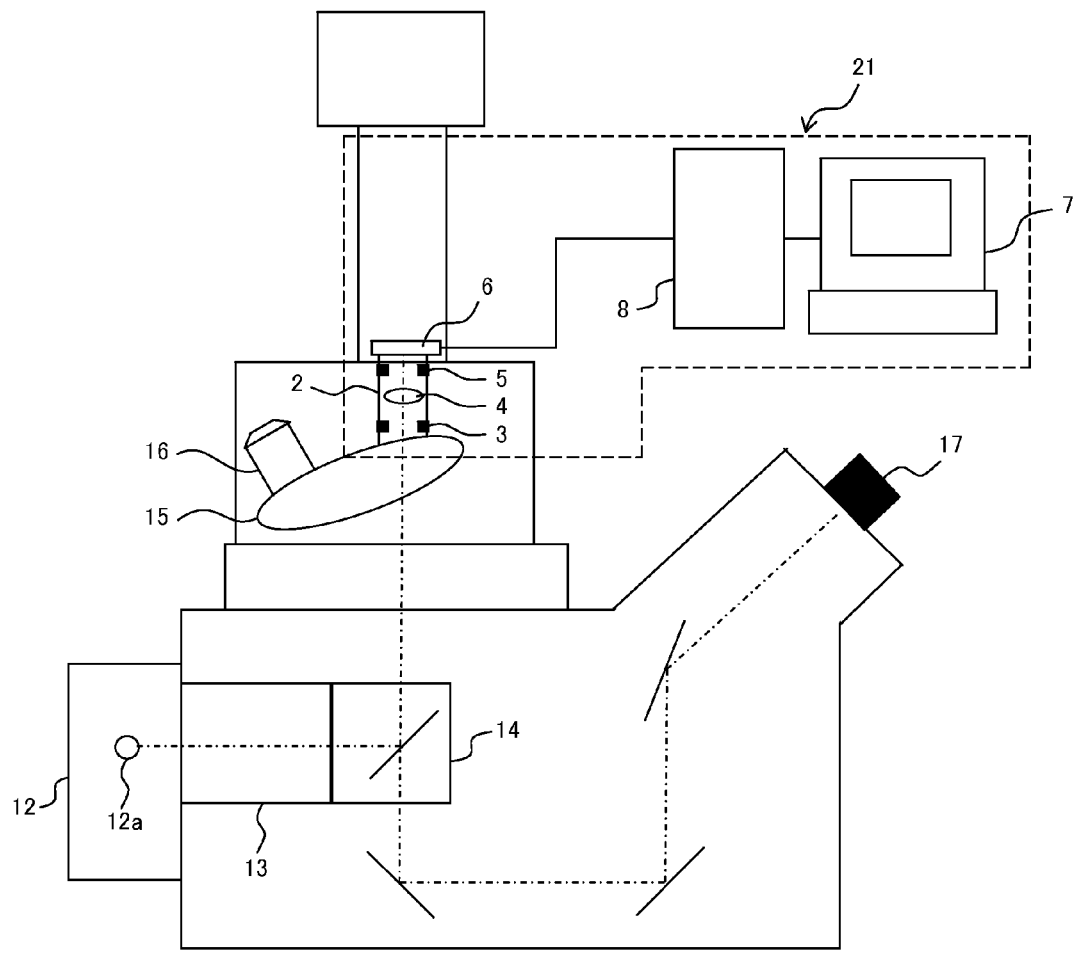
FIG. 3 is a diagram illustrating a configuration of a microscope including a light intensity measuring unit according to Embodiment 2.

FIG. 1 is a diagram illustrating a basic configuration of a light intensity measuring unit according to embodiments of the present invention. First, with reference to FIG. 1, the basic configuration of the light intensity measuring unit according to the embodiments of the present invention will be described.

A light intensity measuring unit 1 illustrated in FIG. 1 measures the intensity of illumination light, excitation light, stimulation light, or the like emitted from a microscope. The light intensity measuring unit 1 is installed in a microscope for use.

The light intensity measuring unit 1 includes an aperture stop 3, a field stop 5, and a measurement lens 4 arranged between the aperture stop 3 and the field stop 5. Moreover, the light intensity measuring unit 1 may include a photodetector 6 for measuring the intensity of light.

The aperture stop 3, the measurement lens 4, and the field stop 5 are housed in a light intensity measuring unit main body 2 serving as a housing. An interface section 2a for attachment to a microscope is provided at one end of the light intensity measuring unit main body 2. A holding mechanism (not shown in the drawings) for holding the photodetector 6 is provided at the other end of the light intensity measuring unit main body 2. The interface section 2a and the holding mechanism are provided at the end of the light intensity measuring unit main body 2 closer to the aperture stop 3 and at the end of the light intensity measuring unit main body 2 closer to the field stop 5, respectively, with respect to the measurement lens 4. Thus, with the photodetector 6 held in the holding mechanism, the field stop 5 is positioned between the measurement lens 4 and the photodetector 6.

In the light intensity measuring unit main body 2, the aperture stop 3 is positioned on or close to a back focal plane of the measurement lens 4 including a back focal position FB. The field stop 5 is positioned on or close to a front focal plane of the measurement lens 4 including a front focal position FF.

The measurement lens 4 may be formed of at least one lens and may have any configuration as long as the measurement lens 4 satisfies the above-described positional relationship with the aperture stop 3 and the field stop 5. The measurement lens 4 illustrated in FIG. 1 is formed of a single lens for simplified description.

The aperture stop 3 may be configured to allow the diameter thereof to be varied. Alternatively, the aperture stop 3 may be arranged in the light intensity measuring unit main body 2 so as to be replaceable with another one with a different diameter. Similarly, the field stop 5 may be configured to have the diameter thereof varied. Alternatively, the field stop 5 may be arranged in the light intensity measuring unit main body 2 so as to be replaceable with another one with a different diameter.

The photodetector 6 may be of, for example, a photodiode type or a thermopile type. The photodetector 6 is not limited to these types but any photodetector may be used. Furthermore, the photodetector 6 is attached to the outside of the light intensity measuring unit main body 2 in FIG. 1 but may be arranged inside the light intensity measuring unit main body 2.

The light intensity measuring unit 1 configured as described above is installed in a microscope so that the aperture stop 3 is positioned on or close to a plane conjugate to a back focal plane of the objective installed in the microscope and so that the field stop 5 is positioned on or close to a plane conjugate to a front focal plane of the objective installed in the microscope.

Since the aperture stop 3 and the field stop 5 are positioned on or close to the back and front focal planes, respectively, of the measurement lens 4, when the aperture stop 3 is positioned on or close to the plane conjugate to the back focal plane of the objective, the field stop 5 is naturally positioned on or close to the plane conjugate to the front focal plane of the objective. Thus, the light intensity measuring unit 1 may actually be installed in the microscope so that the aperture stop 3 is positioned on or close to the plane conjugate to the back focal plane of the objective.

Furthermore, to place the aperture stop 3 on or close to the plane conjugate to the back focal plane of the objective, the light intensity measuring unit main body 2 may desirably be structured to allow the entire length thereof, particularly, the length from the interface section 2a to the aperture stop 3 to be increased and reduced.

Now, the operation of the light intensity measuring unit 1 installed in the microscope will be specifically described with reference to FIG. 1.

First, light equivalent to light incident on the objective during observation enters the aperture stop 3. This is because the aperture stop 3 is arranged on or close to the plane conjugate to the back focal plane of the objective. Specifically, substantially parallel light rays that are chief rays passing through the back focal position FB of the measurement lens 4 enter the aperture stop 3. Thus, when the diameter of the aperture 3 is equal to the pupil diameter of the objective, light subjected to vignetting by the pupil of the objective and prevented from entering the measurement area during observation can be excluded by the aperture lens 3 during measurement. That is, the aperture stop 3 functions equivalently to the pupil of the objective.

Light having passed through the aperture stop 3 is incident on the measurement lens 4 in the form of substantially parallel rays, which are thus collected to a position on or close to the front focal plane of the measurement lens 4 where the field stop 5 is located. The front focal plane of the measurement lens 4 corresponds to the front focal plane of the objective during observation and thus to a specimen surface. Hence, the field stop 5 can be used to exclude light traveling outside the measurement area and diffracted light and stray light which are not intended to be measured by adjusting the diameter of the field stop 5 so that the field number (the magnification of the measurement lens 4×the diameter of the field stop 5, where the magnification of the measurement lens 4 can be determined by the following formula: the magnification of the objective×the focal distance of the objective/the focal distance of the measurement lens) corresponding to the area of the aperture in the field stop 5 is equal to the field number corresponding to the size of the measurement area on the specimen surface during observation. Light having passed through the field stop 5 is subsequently detected by the photodetector 6.

Light having passed through the field stop 5 becomes divergent light and the photodetector 6 is desirably arranged on or close to the field stop 5. This is because a shorter distance to the field stop 5 allows a smaller photodetector 6 to detect all of the light.

As described above, the light intensity measuring unit 1 can accurately measure the light quantity equivalent to the total quantity of light impinging on the measurement area during observation when the diameter of the aperture stop 3 is equal to the pupil diameter of the objective and when the field number corresponding to the area of the aperture in the field stop 5 is equal to the field number corresponding to the size of the measurement area. Furthermore, with the light intensity measuring unit 1, light intensity per unit area of light impinging on the measurement area on the specimen surface during observation can be accurately and easily calculated by dividing the measured total light quantity by the size of the measurement area of the specimen surface during observation.

Since the field number during measurement is equal to the field number during observation, the size of the measurement area on the specimen surface during observation is determined, by the following expression, using the diameter of the field stop 5, the focal distance of the measurement lens 4, and the focal distance of the objective during observation. In the expression, S denotes the measurement area on the specimen surface, $\phi$ denotes the diameter of the field stop 5, F denotes the focal distance of the measurement lens 4, and Fob denotes the focal distance of the objective during observation.

$$S = \pi \times (\phi \times Fob/F)^2$$

Even with Kohler illumination, the intensity distribution of the measurement area on the specimen surface is not always uniform because of light distribution of a light source or vignetting in an illumination optical system. Thus, the area of the aperture in the field stop 5 may be variable so as to set a part of the measurement area to be a measurement target. This allows the light intensity per unit area for a local measurement area to be accurately calculated. Furthermore, in this case, the field stop may be movable in an XY direction.

Specifically, the diameter of the field stop 5 desirably satisfies the conditional expression shown below. In the expression, $\phi$ denotes the diameter of the field stop 5, and F denotes the focal distance of the measurement lens 4. If the measurement lens 4 is formed of a plurality of lenses, F denotes the total focal distance of the measurement lens 4.

$$1 < F/\phi < 500 \qquad (1)$$

With the light intensity measuring unit 1, satisfying Conditional Expression (1) allows accurate calculation of the light intensity per unit area of light impinging on the measurement area on the specimen surface.

When the lower limit value of Conditional Expression (1) is not reached, that is, when the diameter of the field stop 5 is excessively large with respect to the focal distance F of the measurement lens 4, then the diameter of the field stop 5 is excessively large with respect to the flux diameter of light passing through the field stop 5. Thus, the area of the aperture in the field stop 5, used to calculate the light intensity per unit area, includes the area of a portion through which light fails to pass. This makes the light intensity value per unit area inaccurate.

On the other hand, when the upper limit value of Conditional Expression (1) is exceeded, that is, when the diameter of the field stop 5 is excessively small with respect to the focal distance F of the measurement lens 4, then light incident on the field stop 5 is diffracted at the field stop 5. Thus, the photodetector 6 fails to accurately detect the light quantity corresponding to the area of the aperture in the field stop 5. This makes the calculated value of light intensity per unit area inaccurate.

Now, embodiments will be specifically described.

Embodiment 1

FIG. 2 is a diagram illustrating a configuration of a microscope including a light intensity measuring unit according to the present embodiment. A microscope 10 illustrated in FIG. 2 is an inverted microscope and includes a light intensity measuring unit 11, a light source unit 12 with a light source 12a, an illumination unit 13, a mirror unit 14 for combining an illumination optical path with a detection optical path, an objective nosepiece 15, an objective 16, and an eyepiece 17. The light intensity measuring unit 11 is installed in the objective nosepiece 15. The mirror unit 14 may be, for example, a dichroic mirror.

The light intensity measuring unit 11 according to the present embodiment is different from the light intensity measuring unit 1 illustrated in FIG. 1 in that the light intensity measuring unit 11 includes, in addition to the light intensity measuring unit main body 2 and the photodetector 6, a display device 7 for displaying the light intensity detected by the photodetector 6. The remaining parts of configuration of the light intensity measuring unit 11 are similar to those of the light intensity measuring unit 1 illustrated in FIG. 1. Thus, similar components are denoted by reference numerals similar to those for the light intensity measuring unit 1 illustrated in FIG. 1. The description of these components is omitted.

The light intensity measuring unit 11 is arranged such that the aperture stop 3 is positioned on or close to a plane conjugate to the back focal plane (that is, the pupil plane) of the objective 16. Furthermore, the diameter of the aperture stop 3 is set equal to the pupil diameter of the objective 16.

The operation of the microscope 10 will be described.

Light emitted by the light source 12a is converted into substantially parallel light rays by a collector lens (not shown in the drawings). The substantially parallel light rays enter the mirror unit 14 via the illumination unit 13. The light having entered the mirror unit 14 is then reflected by the mirror unit 14. The reflected light enters the light intensity measuring unit 11 installed in the objective nosepiece 15 as substantially parallel light. The light having entered the light intensity measuring unit 11 first enters the aperture stop 3 in the light intensity measuring unit main body 2.

As described above, the aperture stop 3 is arranged on or close to the plane conjugate to the pupil plane of the objective 16, and the diameter of the aperture stop 3 is equal to the pupil diameter of the objective 16. Thus, light subjected to vignetting by the objective 16 during observation of a specimen using the objective 16 is excluded by the aperture stop 3.

The light passes through the aperture stop 3 and is collected by the measurement lens 4. The light then passes through the field stop 5 and enters the photodetector 6. The light having entered the photodetector 6 is converted into an electric signal by photoelectric conversion, with the intensity of the light displayed on the display device 7.

An observer can accurately and easily calculate the light intensity per unit area of light impinging on the measurement area on the specimen surface by dividing the light intensity displayed on the display device 7 by the size of the measurement area on the specimen surface during observation arithmetically determined from the area of the aperture in the field stop 5 calculated from the diameter of the field stop 5 and the focal distance of the objective during observation.

The diameter of the field stop 5 desirably satisfies Conditional Expression (1) described above. Thus, the light intensity per unit area of a local measurement area can be calculated at a high accuracy.

As described above, the light intensity measuring unit 11 or the microscope 10 according to the present embodiment allow accurate calculation of the light intensity per unit area of light impinging during observation on the measurement area on the specimen surface.

Embodiment 2

FIG. 3 is a diagram illustrating a configuration of a microscope including a light intensity measuring unit according to the present embodiment. The microscope 20 illustrated in FIG. 3 is different from the microscope 10 illustrated in FIG. 2 in that the microscope 20 includes a light intensity measuring unit 21 instead of the light intensity measuring unit 11. The remaining parts of configuration of the microscope 20 are similar to those of the microscope 10 illustrated in FIG. 2. Thus, similar components are denoted by reference numerals similar to those for the microscope 10 illustrated in FIG. 2. The description of these components is omitted.

The light intensity measuring unit 21 according to the present embodiment is different from the light intensity measuring unit 11 according to Embodiment 1 in that the light intensity measuring unit 21 includes, in addition to the light intensity measuring unit main body 2, the photodetector 6, and the display device 7, a recording device 8 for recording the intensity of light detected by the photodetector 6.

As is the case with Embodiment 1, the light intensity measuring unit 21 or the microscope 20 according to the present embodiment allows accurate calculation of the light intensity per unit area of light impinging on the measurement area on the specimen surface during observation.

Embodiment 3

Figure 4:
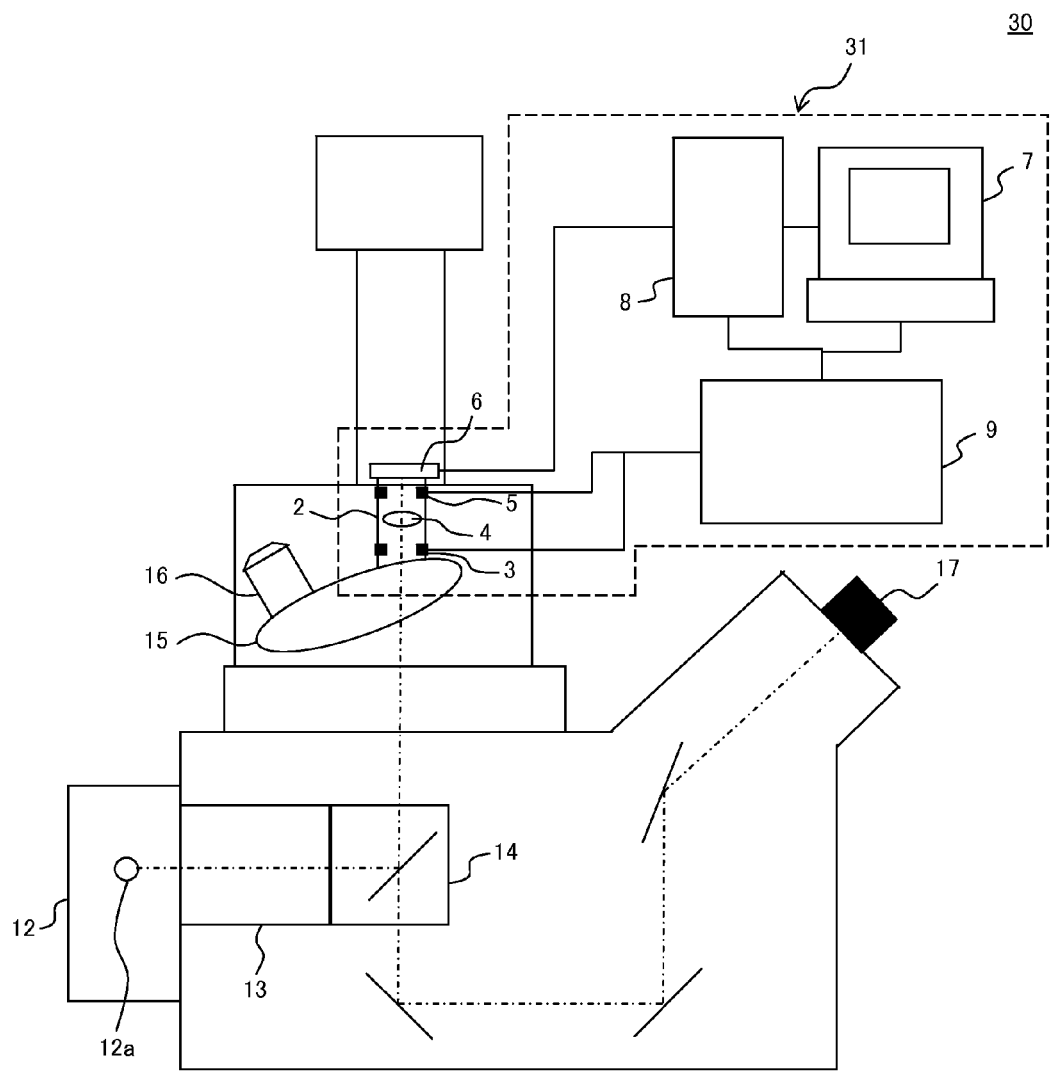
FIG. 4 is a diagram illustrating a configuration of a microscope including a light intensity measuring unit according to Embodiment 3.

FIG. 4 is a diagram showing a configuration of a microscope including a light intensity measuring unit according to the present embodiment. A microscope 30 illustrated in FIG. 4 is different from the microscope 20 illustrated in FIG. 3 in that the microscope 30 includes a light intensity measuring unit 31 instead of the light intensity measuring unit 21. The remaining parts of configuration of the microscope 30 are similar to those of the microscope 20 illustrated in FIG. 3. Thus, similar components are denoted by reference numerals similar to those for the microscope 20 illustrated in FIG. 3. The description of these components is omitted.

The light intensity measuring unit 31 according to the present embodiment is different from the light intensity measuring unit 21 according to Embodiment 2 in that the light intensity measuring unit 31 includes, in addition to the light intensity measuring unit main body 2, the photodetector 6, the display device 7, and the recording device 8, a control device 9 for controlling the diameter of at least one of the aperture stop 3 and the field stop 5.

Furthermore, information on available objectives may be pre-input to the recording device 8. Then, which of the objective is to be used may be determined by detection or input. Based on the information obtained, the control device may calculate the diameter of the aperture stop and the diameter of the field stop and perform the corresponding control.

Specifically, the control device 9 controls the diameter of the aperture stop 3 so that the diameter of the aperture stop 3 is equal to the pupil diameter of the objective 16. This enables a reduction in the observer's burdens involved in the observer's setting operation during measurement using the light intensity measuring unit 31.

Furthermore, the control device 9 may function as a computing device for calculating the light intensity per unit area from the diameter of the field stop 5, the light intensity stored in the recording device 8, the focal distance of the measurement lens, and the focal distance of the objective during observation. The control device 9 may then transmit the calculation result to the display device 7 and the recording device 8. Thus, the observer can easily determine the light intensity per unit area of light impinging on the measurement area on the specimen surface without the need to be conscious of the setting for the field stop 5. Moreover, the control device 9 may control the power of the light source 12a based on the above-described calculation result. This automatically allows excessive light to be inhibited from impinging on the specimen.

If the control device 9 functions as a computing device, the recording device 8 desirably contains information on the transmittance of the objective 16 and the transmittance of the measurement lens 4 recorded therein. When the control device 9 calculates the light intensity per unit area in consideration of the transmittance information recorded in the recording device 8, the observer can more accurately determine the light intensity.

As described above, as is the case with Embodiment 2, the light intensity measuring unit 31 or the microscope 30 according to the present embodiment allows accurate calculation of the light intensity per unit area of light impinging on the measurement area on the specimen surface during observation. Furthermore, as is the case with Embodiment 2, the observer's burdens involved in an extended period of observation can be reduced.

Moreover, in the light intensity measuring unit 31 or the microscope 30 according to the present embodiment, the control device 9 controls the diameters of the aperture stop 3 and the field stop 5. This enables a reduction in burdens involved in an operation for setting the light intensity measuring unit 31 before measurement and also allows possible setting errors to be inhibited. Hence, the light intensity measuring unit 31 or the microscope 30 according to the present embodiment is particularly preferable for calculating the light intensity achieved by each of the objectives with different pupil diameters.

Furthermore, the light intensity measuring unit 31 or the microscope 30 according to the present embodiment allows automated calculation of the light intensity per unit area of light impinging on the measurement area on the specimen surface during observation.

Embodiment 4

Figure 5:
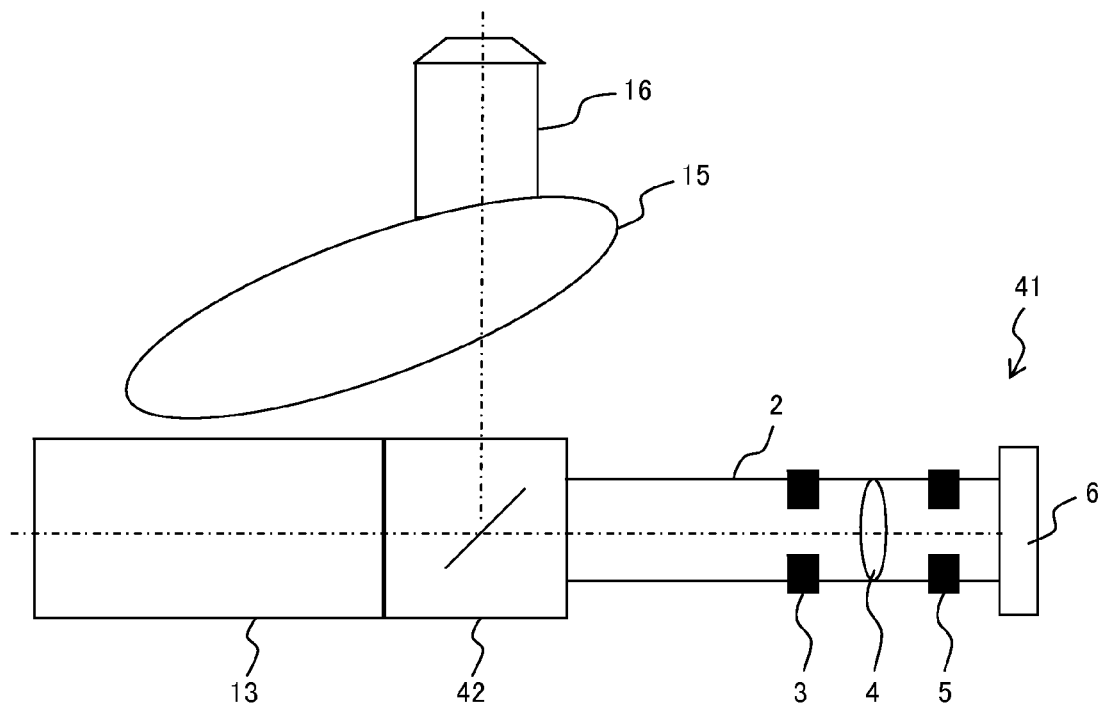
FIG. 5 is a diagram illustrating a configuration of a microscope including a light intensity measuring unit according to Embodiment 4.

FIG. 5 is a diagram showing a configuration of a microscope including a light intensity measuring unit according to the present embodiment.

A microscope 40 illustrated in FIG. 5 is different from the microscopes illustrated in FIG. 2 to FIG. 4 in that a microscope 40 includes a mirror unit 42 instead of the mirror unit 14 and in that a light intensity measuring unit 41 is installed in the mirror unit 42 rather than in the objective nosepiece 15.

Also in the light intensity measuring unit 41 according to the present embodiment, the aperture stop 3 is arranged on or close to a plane conjugate to the back focal plane of the objective 16. FIG. 5 shows that the entire length of the light intensity measuring unit main body 2 has been adjusted to allow the aperture stop 3 included in the light intensity measuring unit 41 to be arranged on or close to the plane conjugate to the back focal plane of the objective 16.

The light intensity measuring unit 41 illustrated in FIG. 5 is formed of components similar to those of the light intensity measuring unit 1 illustrated in FIG. 1 but is not limited to these components. The light intensity measuring unit 41 may be formed of components similar to those of any of the light intensity measuring units illustrated in FIG. 2, FIG. 3, and FIG. 4.

Unlike the mirror unit 14, the mirror unit 42 is configured to split light from the light source unit 12 into two light portions and to guide one of the light portions to the objective nosepiece 15 while guiding the other light portion to the light intensity measuring unit 41. The mirror unit 42 may be, for example, a half mirror.

Thus, the light intensity measuring unit 41 or the microscope 40 according to the present embodiment can produce effects similar to those of Embodiment 1 to Embodiment 3 provided that the characteristics of the transmittance (reflectance) of the mirror unit 42 are known. If the light intensity measuring unit 41 is formed of components similar to those of the light intensity measuring unit 31 according to Embodiment 3, the characteristics of the transmittance (reflectance) of the mirror unit 42 are desirably recorded in the recording device 8.

Moreover, the light intensity measuring unit 41 or the microscope 40 according to the present embodiment allows the mirror unit 42 to guide light simultaneously to both the objective 16 and the light intensity measuring unit 41. This enables observation of the specimen and measurement of the light intensity to be simultaneously carried out.

As illustrated in the present embodiment, the position where the light intensity measuring unit is installed is not limited to the objective nosepiece 15. The light intensity measuring unit can be arranged at any position provided that the aperture stop 3 included in the light intensity measuring unit is located on or close to the plane conjugate to the back focal plane of the objective.

However, it is undesirable that optical elements arranged on the optical paths be greatly different between those on the optical path leading to the objective 16 and those on the optical path leading to the light intensity measuring unit. This is because, for example, light may be absorbed by the optical element on the optical path to make a difference between the intensity of light incident on the objective 16 and the intensity of light incident on the light intensity measuring unit.

Thus, the light intensity measuring unit is desirably installed in the microscope at a position such that the illumination unit 13 is positioned between the light source unit 12 and the light intensity measuring unit. Moreover, the light intensity measuring unit is more desirably installed in the microscope at a position such that a mirror unit for combining an illumination optical path with a detection optical path is positioned between the light source unit 12 and the light intensity measuring unit. This is because, in this case, an excitation filter located on a side of the mirror unit closer to the light source acts both on the optical path leading to the objective 16 and the optical path leading to the light intensity measuring unit.

Embodiment 5

Figure 6:
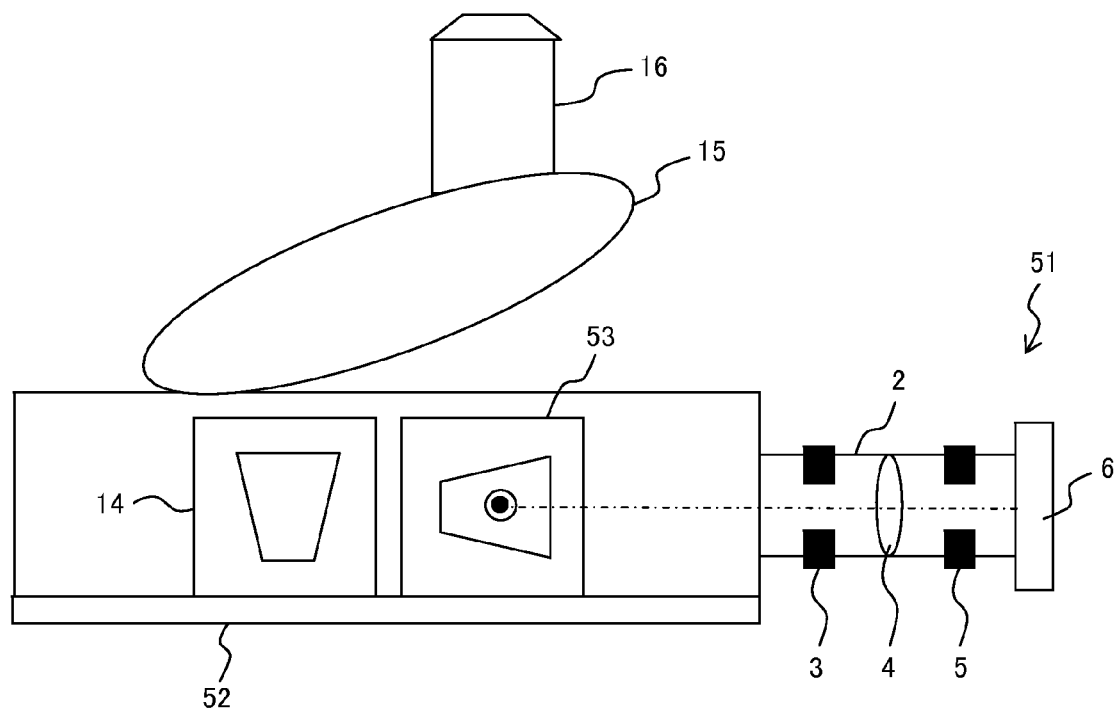
FIG. 6 is a diagram illustrating a configuration of a microscope including a light intensity measuring unit according to Embodiment 5.

FIG. 6 is a diagram showing a configuration of a microscope including a light intensity measuring unit according to the present embodiment.

A microscope 50 illustrated in FIG. 6 is different from the microscope 40 illustrated in FIG. 5 in that a microscope 50 includes a mirror unit turret 52 instead of the mirror unit 42 and in that the light intensity measuring unit 51 is installed in the mirror unit turret 52 rather than in the mirror unit 42.

FIG. 6 is a front view of the microscope 50 (as seen from the eyepiece 17). The light source unit 12 and the illumination unit 13 are arranged behind the mirror unit turret 52.

The configuration of the light intensity measuring unit 51 according to the present embodiment is similar to that of the light intensity measuring unit 41 according to Embodiment 4. Thus, as is the case with the light intensity measuring unit 41 according to Embodiment 4, the aperture stop 3 is arranged on or close to the plane conjugate to the back focal plane of the objective 16, and the light intensity measuring unit 51 may be formed of components similar to those of any of the light intensity measuring units illustrated in FIG. 2, FIG. 3, and FIG. 4.

The mirror unit turret 52 includes a mirror unit 14 (first mirror unit) for guiding light from the light source unit 12 to the objective 16 and a mirror unit 53 (second mirror unit) for guiding light from the light source unit 12 to the light intensity measuring unit 51. The mirror unit 14 is similar to those illustrated in Embodiment 1 to Embodiment 3. The mirror units 14 and 53 may each be, for example, a dichroic mirror.

Mirror units each for combining an illumination optical path with a detection optical path are often arranged on a turret for switching between the mirror units as illustrated in FIG. 6. Thus, the light intensity measuring unit may be installed on the turret. However, in this case, to allow the light intensity to be measured with an appropriate accuracy, light guided from the mirror unit 14 to the objective 16 has substantially the same quantity as that of light guided from the mirror unit 53 to the light intensity measuring unit 51.

Thus, the reflection characteristics of the mirror unit 14 are desirably substantially equal to the transmittance characteristics of the mirror unit 53. Furthermore, for a similar reason, if, for example, an excitation filter or the like is included in the mirror unit 14, a filter with similar characteristics is desirably included in the mirror unit 53.

Thus, the light intensity measuring unit 51 or the microscope 50 according to the present embodiment can also produce effects similar to those of Embodiment 1 to Embodiment 3.

Embodiment 6

Figure 7:
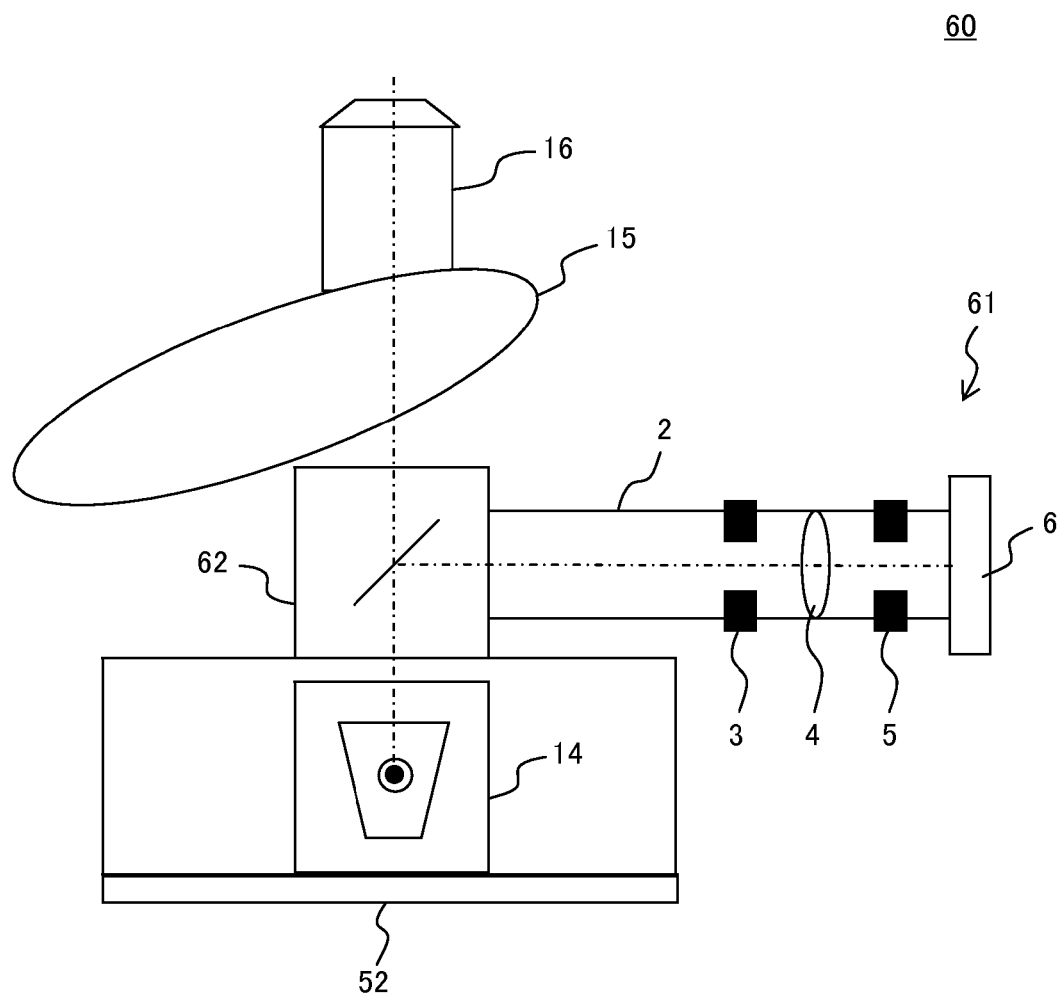
FIG. 7 is a diagram illustrating a configuration of a microscope including a light intensity measuring unit according to Embodiment 6.

FIG. 7 is a diagram showing a configuration of a microscope including a light intensity measuring unit according to the present embodiment.

A microscope 60 illustrated in FIG. 7 is different from the microscope 50 illustrated in FIG. 6 in that the microscope 60 includes a mirror unit 62 arranged between the mirror unit 14 and the objective 16, instead of the mirror unit 53 arranged on the mirror unit turret 52 and in that a light intensity measuring unit 61 is installed in the mirror unit 62 rather than in the mirror unit turret 52.

FIG. 7 is a front view of the microscope 60 (as seen from the eyepiece 17). The light source unit 12 and the illumination unit 13 are arranged behind the mirror unit turret 52.

The configuration of the light intensity measuring unit 61 according to the present embodiment is similar to that of either of the light intensity measuring units according to Embodiment 4 and Embodiment 5. Thus, as is the case with the light intensity measuring units according to Embodiment 4 and Embodiment 5, the aperture stop 3 is arranged on or close to the plane conjugate to the back focal plane of the objective 16, and the light intensity measuring unit 61 may be formed of components similar to those of any of the light intensity measuring units illustrated in FIG. 2, FIG. 3, and FIG. 4.

Thus, the light intensity measuring unit 61 or the microscope 60 according to the present embodiment can also produce effects similar to those of Embodiment 1 to Embodiment 3.

The microscope in which the light intensity measuring unit is installed desirably includes interfaces located at a plurality of positions and which are compatible with the interface section 2a of the light intensity measuring unit. For example, the microscope may include interfaces located at all the positions where the light intensity measuring units shown in FIG. 1 to FIG. 6 are installed, the interface being compatible with the interface section 2a of the light intensity measuring unit.

Moreover, when the light intensity measuring unit 61 or the microscope 60 according to the present embodiment is configured to include the recording device 8, the light intensity detected by the photodetector 6 is recorded in the recording device 8. Thus, if a temporal variation in specimen is observed over time as in time-lapse observation, the observer need not always stay near the microscope 40. This enables a substantial reduction in the observer's burdens.

In this case, the light intensity detected by the photodetector 6 may be recorded in the recording device 8 exclusively during image pickup for time lapse observation. Thus, the recording device 8 may be configured such that the light intensity detected by the photodetector 6 may be recorded in the recording device 8, for example, every predetermined time.

Embodiment 7

Figure 8:
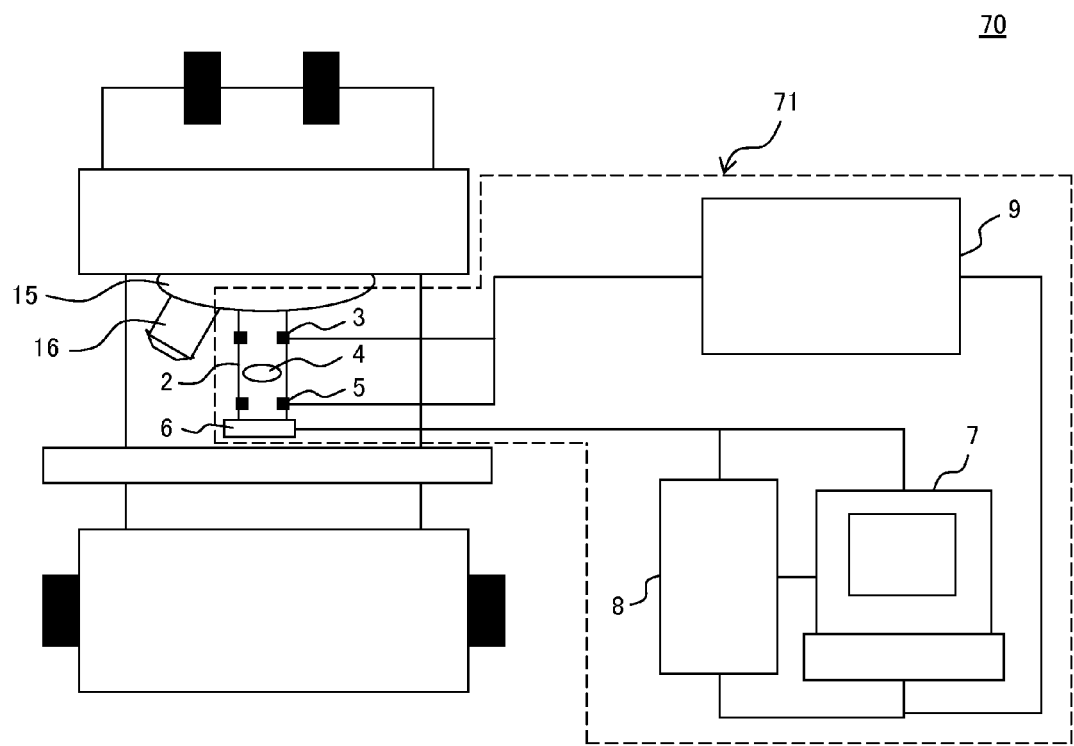
FIG. 8 is a diagram illustrating a configuration of a microscope including a light intensity measuring unit according to Embodiment 7.

FIG. 8 is a diagram showing a configuration of a microscope including a light intensity measuring unit according to the present embodiment.

A microscope 70 illustrated in FIG. 8 is an upright microscope with a light intensity measuring unit 71 installed therein. In each of Embodiments 1 to 6 described above, an inverted microscope is illustrated as the microscope in which the light intensity measuring unit is installed. However, the microscope in which the light intensity measuring unit is installed may be an upright microscope instead of the inverted microscope.

The configuration of the light intensity measuring unit 71 is similar to that of the light intensity measuring unit 31 according to Embodiment 3. Furthermore, the configuration of the microscope 70 is similar to that of the microscope 30 illustrated in FIG. 4 except in that the microscope 70 is configured as an upright microscope.

Thus, the light intensity measuring unit 71 or the microscope 70 according to the present embodiment can also produce effects similar to those of Embodiment 3.

What is claimed is:

1. A microscope, comprising:
an objective; and
a light intensity measuring unit for measuring an intensity of light emitted from the microscope, the light intensity measuring unit comprising:
an aperture stop arranged on or close to a plane corresponding to a back focal plane of the objective during observation;
a field stop arranged on or close to a plane corresponding to a front focal plane of the objective during observation;
at least one measurement lens arranged between the aperture stop and the field stop;
an interface for attachment to the microscope; and
a photodetector for measuring a light intensity,
wherein:
the field stop is positioned on or close to a front focal plane of the at least one measurement lens, and positioned between the at least one measurement lens and the photodetector;
the aperture stop is positioned on or close to a back focal plane of the at least one measurement lens; and
the light intensity measuring unit is installed in the microscope such that light equivalent to light incident on the objective during observation enters the aperture stop.

2. The microscope according to claim 1, wherein the light intensity measuring unit is provided in the microscope at a position such that an illumination unit included in the microscope is positioned between a light source unit included in the microscope and the light intensity measuring unit.

3. The microscope according to claim 2, wherein the aperture stop has a variable diameter.

4. The microscope according to claim 2, wherein the aperture stop is arranged so as to be replaceable with an aperture stop with a different diameter.

5. The microscope according to claim 3, wherein the field stop has a variable diameter.

6. The microscope according to claim 3, wherein the field stop is arranged so as to be replaceable with a field stop with a different diameter.

7. The microscope according to claim 5, wherein when $\phi$ denotes the diameter of the field stop and F denotes a total focal distance of the at least one measurement lens, a conditional expression:

$$1 < F/\phi < 500$$

is satisfied.

8. The microscope according to claim 1, further comprising a recording device for recording an intensity of light detected by the photodetector.

9. The microscope according to claim 1, further comprising a control device for controlling a diameter of at least one of the aperture stop and the field stop.

10. The microscope according to claim 9, wherein the control device controls the diameter of the aperture stop so as to set the diameter of the aperture stop equal to a pupil diameter of the objective.

11. The microscope according to claim 1, wherein the light intensity measuring unit is installed in an objective nosepiece included in the microscope.

12. The microscope according to claim 1, wherein the light intensity measuring unit is installed on a mirror unit turret arranged between an objective nosepiece included in the microscope and a light source unit.

13. The microscope according to claim 12, wherein the mirror unit turret comprises:
a first mirror unit arranged thereon to guide light from the light source unit to the objective nosepiece; and
a second mirror unit arranged thereon to guide light from the light source unit to the light intensity measuring unit.

14. The microscope according to claim 1, wherein:
the light intensity measuring unit is installed in a mirror unit arranged between an objective nosepiece included in the microscope and a light source unit; and
the mirror unit splits light from the light source unit into light portions and guides one of the light portions to the objective nosepiece while guiding the other light portion to the light intensity measuring unit.

15. The microscope according to claim 1, wherein:
the microscope comprises a mirror unit turret arranged between an objective nosepiece included in the microscope and a light source unit; and
the light intensity measuring unit is installed in a mirror unit interposed between a mirror unit arranged on the mirror unit turret and the objective nosepiece.

16. The microscope according to claim 1, wherein the microscope comprises interfaces located at a plurality of positions and which are compatible with the interface.

* * * * *